May 20, 1958  M. J. FLEMING, JR  2,835,319
INFLATABLE SELF CONTRACTING TIRE BEAD SEATING DEVICE
Filed March 2, 1955
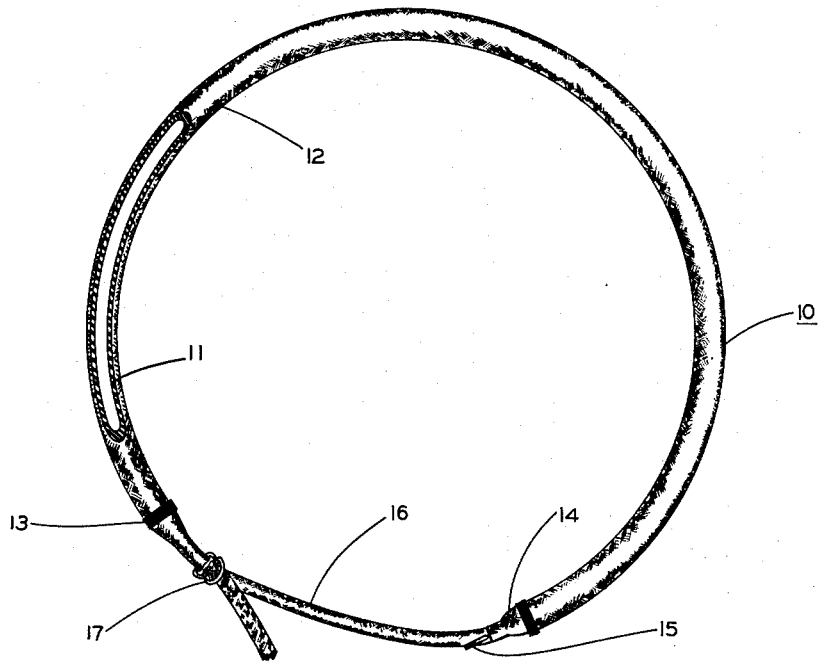
FIG. 1
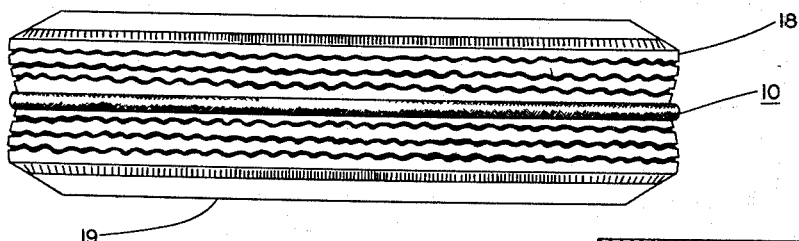
FIG. 2
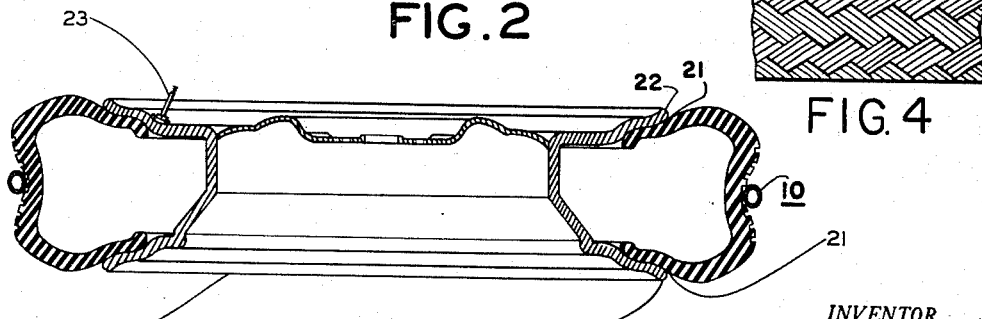
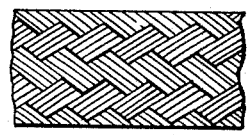
FIG. 4
FIG. 3
*INVENTOR.*
MATTHEW J. FLEMING JR.
BY *Max L. Wymore*
AGENT 2,835,319
Patented May 20, 1958

2,835,319

INFLATABLE SELF CONTRACTING TIRE BEAD SEATING DEVICE

Matthew J. Fleming, Jr., McConnelsville, Ohio, assignor to Clevite Corporation, Cleveland, Ohio, a corporation of Ohio Application March 2, 1955, Serial No. 491,663

5 Claims. (Cl. 157—1.21)

This invention relates to a clamping device and more particularly to a bead expander for tubeless tires to facilitate inflation when the tire is mounted upon the rim of a wheel.

As used throughout the specification, the term "contraction" has the usual dictionary meaning of shortening and thickening of a muscle fiber or of a muscle when in action, the term "helical angle" refers to the angle that a helically wound braid strand makes with a line drawn on the surface of the braid parallel to its longitudinal axis, and the term "equi-radial compression" refers to the application of a substantially equal compressive force to each radius of a circular object.

One type of bead expander which has previously been used for such purpose utilizes a flat metal band, to encircle the tread of a mounted tubeless tire, having a ratchet arrangement to shorten the length of the band about the tire. As the ratchet is operated the band is shortened depressing the center of the tread, and the bead is urged into contact with the rim to produce an air tight seal. The tire is then inflated by introducing air into the interior of the tire through a valve in the rim. One disadvantage to this type of bead expander is that the length of the band must be increased, as by backing off the ratchet, when the tire is inflated otherwise the metal band and/or the ratchet mechanism will be damaged by the forces applied thereto by the expanding tire. Another difficulty experienced with prior art devices using a non-resilient encircling band is that the band must slip over the surface of the tire as it is shortened or lengthened. This leads to the application of uneven radial forces on the tire tending to diminish the probability of an air tight seal being formed with the rim. Further the operation of the ratchet must be coordinated with the introduction of air into the tire increasing the complexity of use.

Another type of bead expander previously used for such purpose utilizes a metal band similar to that mentioned above actuated by a piston and cylinder arrangements driven by compressed air. This device is subject to the same disadvantages as the above device and in addition requires the use of a bulky and cumbersome prime mover and linkage.

It is an object of this invention, therefore, to provide an improved clamping device which avoids one or more of the disadvantages of the prior art arrangements and one which is more versatile in its use.

It is a further object of this invention to provide a clamping device which is simple and convenient to operate and is economical in cost and maintenance.

It is a further object of the invention to provide a clamping device which is light in weight and adapted to clamp irregular shapes.

For a better understanding of the present invention together with other and further objects thereof, reference is had to the following description taken in connection with the accompanying drawing and its scope will be pointed out in the appended claims.

In accordance with the invention, the clamping device comprises an encircling means having substantial circumferential compliance throughout substantially its entire circumferential length, and control means for controlling the application of force to actuate the encircling means materially to decrease its circumference by the uniform intrinsic contraction of each incremental unit of length of said encircling means, the circumferential compliance of the encircling means being sufficient to permit forced expansion to its original circumference without damage thereto in spite of the continued application of said force through said control means. The encircling means includes an expansible chamber motor as set forth and described in copending patent application Serial No. 483,117 filed January 20, 1955 by Richard H. Gaylord and assigned to the same assignee as the instant invention and copending patent application Serial No. 372,130 filed August 3, 1953 by Richard H. Gaylord. Such a motor comprises an elongated expansible tube of rubber, neoprene and the like, surrounded by a woven sheath, such as a braided tube of metal, Orlon, nylon and the like. The tubular sheath is composed of braided flat tapes individually defined by strands. The tapes are disposed at acute angles to planes normal to the axis of the expansible tube and are interwoven to form a braid of the type shown in Figure 1. A fluid tight load fitting is attached to each end of the sheath forming a fluid tight chamber with the expansible tube. At least one fitting has a valved conduit therein communicating with the interior of the tube. When pressure is applied to the interior of the tube, via the valved conduit, it will expand, expanding the braid. When the braid expands it shortens in length by contraction and applies a force on a load connected to the end fittings. In accordance with this invention the ends of the expansible chamber motor are connected by a flexible member of adjustable length affixed between the end fittings to form a clamping device in which the encircling length may be varied.

In considering the theory of operation and the forces operating on the motor, the force output has been found to be, (1) $$F = \frac{P \pi D_{45}^2}{2} = (3 \cos^2 \phi - 1)$$

where:

$F$ = the force exerted by the motor
$P$ = pressure differential
$D_{45}$ = diameter of the sheath at $\phi = 45°$ and $\phi$ = the helical angle—the angle between each effective strand of the sheath and a line drawn upon the surface of the sheath parallel to its longitudinal axis.

and the length of the motor is (2) $$L = S \cos \phi$$

where:

$L$ = length
$S$ = effective length of strands forming the motor and $\phi$=the helical angle—the angle between each effective strand of the sheath and a line drawn upon the surface of the sheath parallel to its longitudinal axis.

It follows from Eq. 1 and 2 that, without load, maximum contraction occurs when $$(3) \qquad L = S\frac{1}{\sqrt{3}} = S(.577)$$

or when $\phi = 55°40'$ since the force output will be zero at this point. This corresponds to a contraction of approximately 30% in length since at the extended position cos $\phi$ can seldom exceed 0.9 in a braid made of sufficient material to be reasonably durable.

When $\phi = 45°$ the force output of the motor is equal to that of a piston and cylinder of the same diameter at this angle $$(4) \qquad \cos \phi = \sqrt{\tfrac{1}{2}}$$

Substituting 4 in 1 gives the well known equation for the output of a piston and cylinder.

$$(5) \qquad F = \frac{P \pi D_{45°}^2}{4} = P \pi r_{45°}^2.$$

It is usual in the applications of the motor to consider its stroke to terminate at $\phi = 45°$ and operate between this and a $\phi$ of from 25° to 30° when extended. Under this mode of operation the stroke is approximately 20% of the extended length. The force exerted by the motor or the force output at the beginning of stroke from the extended position is three times that exerted by a piston and cylinder of the same diameter and is equal to the output of such a piston and cylinder at the end of stroke where $\phi = 45°$.

In the drawing, Figure 1 shows a plan view of the clamping device of this invention partially in section. Figure 2 shows a side view of the clamping device of Figure 1 as a bead expander for a tubeless tire. Figure 3 is a cross section of the tire and clamping device shown in Figure 2. Figure 4 shows a portion of a braided sheath.

Referring to Figure 1, there is shown a plan view of the clamping device embodying the invention. The clamping device 10 comprises an elongated expansible tube 11, surrounded by a tubular braided sheath 12 of metal, nylon, Orlon and the like with end fittings 13 and 14 attached at each end to the braid and enclosed tube forming a fluid tight chamber. End fitting 14 is provided with a valved conduit 15 communicating with the interior of tube 11. Flexible band 16, which may be a continuation of braided sheath 12, is affixed to end fitting 14. Buckle 17, to which band 16 may be adjustably secured, is affixed to end fitting 13. Sheath 12 is comprised of a number of helices which are interwoven. When these are expanded radially, the helix angle is reduced with resulting circumferential expansion of the sheath at the expense of its length.

While the device of the invention is of general utility as a clamping device particular reference is had to Figures 2 and 3 where the clamping device is shown in use as a bead expander for a tubeless tire. The bead of a tubeless tire must be forced into contact with the rim of a wheel, making an air tight seal, before it can be inflated. The clamping device 10 is positioned to encircle the tread 18 of tire 19 mounted on wheel 20. Strap 16 is adjusted for a snug fit and air is introduced under pressure into the interior of the clamping device through valve 15. As the clamping device expands, it contracts and depresses the center of the tread 18 under equi-radial compression, forcing bead 21 against rim 22 of wheel 20. A relatively narrow encircling band is to be preferred as greater lateral forces are produced to urge the bead into sealing contact with the rim than are produced with a relatively wide band. Air is introduced into the interior of tire 19 through valve 23 positioned in rim 22. As the tire is inflated the clamping device automatically expands along with the tire. This is in contrast to non-resilient prior art clamping devices where the tension on the clamp is required to be backed off as the tire is inflated otherwise the prior art clamp will be damaged or broken by the expanding tire.

The following is illustrative of a specific example of the invention. The bead expander, Figure 1, was constructed with tube 11 of neoprene surrounded with a braided sheath 12 of nylon. End fittings 13 and 14 were individually attached to each end of the braid and enclosed tube with a flexible member 16 of adjustable length affixed between end fittings 13 and 14 to provide a circumference sufficient to encircle a large tire and adjustable to the circumference of a smaller tire.

The clamping device according to this invention provides a bead expander which is economical in construction, light in weight, convenient to handle and not subject to deterioration from rust, battery acid and grease normally associated with its use. Further it is foolproof in operation and automatically compensates for the expansion of the tire upon inflation.

Although the above described embodiment discloses the invention as applied to expanding the bead of a tubeless tire it is to be understood that the invention may be used in the clamping generally. When used with irregular shapes the clamp, being flexible, assumes the shape of the piece being clamped and provides radial compression at points of contact.

While there has been described what at present are considered to be the preferred embodiments of this invention, it will be obvious to those skilled in the art that various changes and modifications may be made therein without departing from the invention. It is aimed therefore in the appended claims to cover all such changes and modifications which fall within the true spirit and scope of the invention.

I claim:

1. A clamp for producing radial compression comprising an elongated expansible tube surrounded by a tubular braided sheath the individual strands of which form a series of interwoven helices, an end fitting attached to each end of said braided sheath and enclosed tube forming a fluid tight expansible tubular chamber which contracts lengthwise when expanded circumferentially, a conduit through at least one of said end fittings communicating with the interior of said chamber, a flexible member of adjustable length affixed between said end fittings, and a valve positioned in said conduit whereby fluid under pressure may be controllably introduced into the interior of said expansible chamber.

2. A clamp as set forth in claim 1 wherein the tubular braided sheath has a helical angle of from about 25° to about 45°.

3. A clamp as set forth in claim 1 wherein the tubular braided sheath has a helical angle of from 25° to 30° in the extended state.

4. A clamp as set forth in claim 1, further characterized by said flexible member being an integral portion of said braided sheath.

5. A clamp for producing radial compression on the tread of a tubeless tire for initially seating the tire bead against a rim to facilitate inflation of the tire, comprising, an elongated expansible tube, a tubular braided sheath the individual strands of which are helices forming a series of interwoven helices surrounding said tube, end fittings attached to each end of said tube and to the braided sheath at the location of the ends of said tube closing the ends of said expansible tube forming a fluid tight expansible chamber which contracts lengthwise when expanded circumferentially, valve means extending through one of said end fittings communicating with the interior of said chamber, a flexible member of adjustable length connected to one of said end fittings and adapted to be connected to the other of said end fittings, said clamp snugly encircling a tire so that upon application of fluid under pressure through said valve to the interior of said tube said tube and braided sheath expand radially causing a contraction in the length of said clamp around said tire thereby squeezing said tire tread radially inwardly with consequent flaring outwardly of the tire beads into contact with said rim, said clamp, due to the inherent compliance of said expansible tube and said braided sheet, having longitudinal compliance causing said clamp to stretch as air is put into said tire for inflating same.

References Cited in the file of this patent

UNITED STATES PATENTS

| | | |
|---|---|---|
| 1,103,717 | Walton et al. | July 14, 1914 |
| 1,384,176 | Bartlett et al. | July 12, 1921 |
| 1,457,457 | Peyer | June 5, 1923 |
| 1,521,342 | Thomas et al. | Dec. 30, 1924 |
| 1,966,580 | Bull | July 17, 1934 |
| 2,322,962 | Dickson et al. | June 29, 1943 |
| 2,468,133 | Sullivan | Apr. 26, 1949 |
| 2,660,174 | Saemann | Nov. 24, 1953 |
| 2,679,662 | Pfeiffer | June 1, 1954 |